R. C. LANPHIER.
SHUNT FOR ELECTRIC METERS.
APPLICATION FILED SEPT. 4, 1909.
958,508.
Patented May 17, 1910.
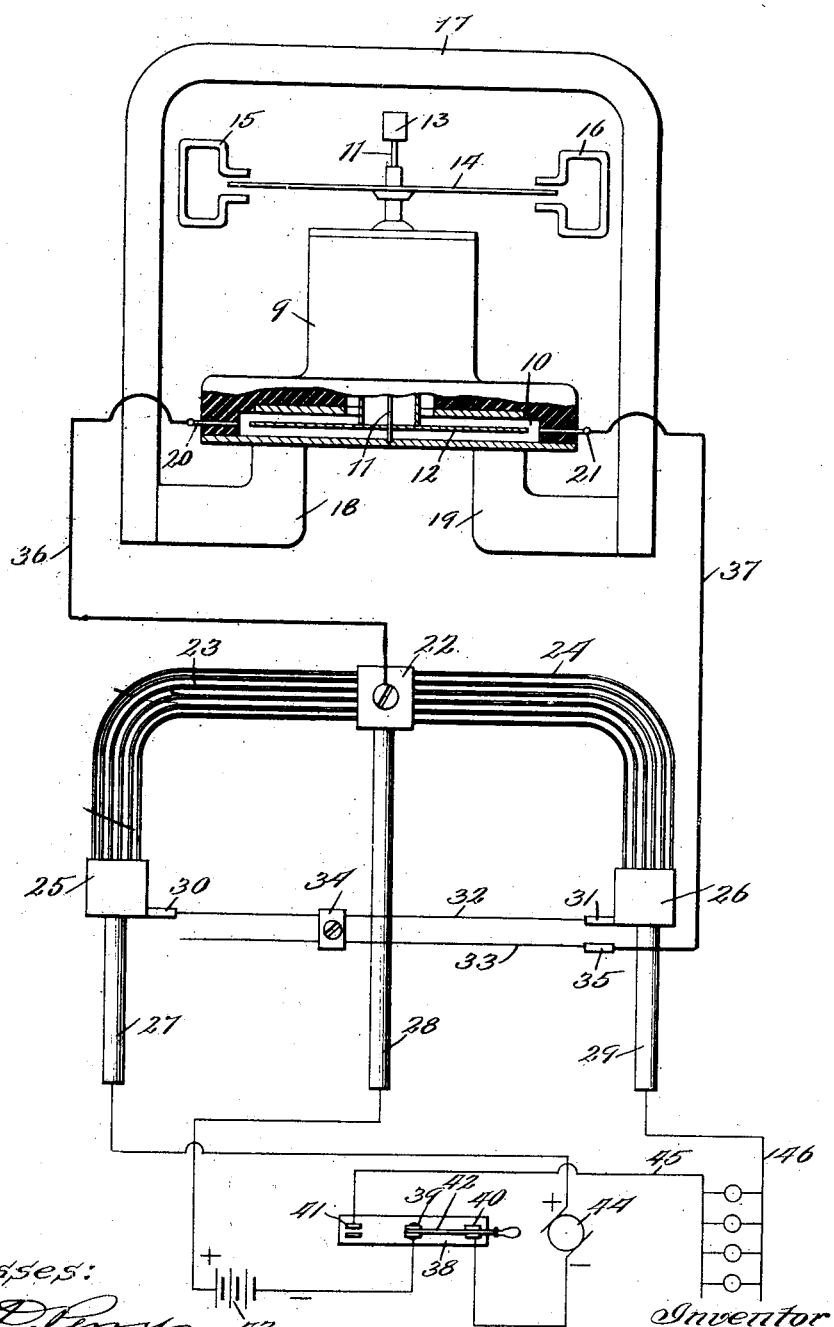

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

SHUNT FOR ELECTRIC METERS.

958,508.  Specification of Letters Patent.  Patented May 17, 1910.

Application filed September 4, 1909. Serial No. 516,178.

*To all whom it may concern:*

Be it known that I, ROBERT C. LANPHIER, a citizen of the United States, residing at Springfield, in the county of Sangamon, State of Illinois, have invented certain new and useful Improvements in Shunts for Electric Meters, of which the following is a specification, reference being had to the accompanying drawing.

My invention relates to shunts for electric meters, and its principal object is to provide a new and improved differential shunt or double drop shunt in connection with meters, especially when used to record charge and discharge of storage batteries, in order to give automatically and without any attention on the part of the operator any desired percentage of overcharge, when charging storage batteries, as compared with the amount discharged.

It is well known that if a storage battery is rated, for example, to give thirty amperes for four hours before reaching a condition approaching complete discharge, it will have a normal capacity of one hundred twenty ampere-hours. When charging, it is found that the same battery will require from one hundred thirty-five to one hundred forty-five ampere-hours in order to bring it up to full charge potential and gravity. The difference between the amount discharged and the amount put in is the internal loss in the battery. When an ampere-hour meter with an ordinary single drop shunt is used with a battery to record charge and discharge, it will show accurately the true ampere-hours of either charge or discharge, since the proportion of the current diverted from the shunt device through the meter is the same whether the current is passing in charge or discharge direction. With this old arrangement of shunt, however, it is necessary to manually reset or advance the indicating hand of the meter to obtain the desired overcharge by the time the hand reaches zero.

It is the object of my invention to provide a device by which this may be accomplished automatically and without any manual resetting of the indicating hand. I accomplish this by providing a new and improved differential or double drop shunt by which any desired percentage of difference between the rate of rotation of the armature on charge and the rate of rotation of the armature on discharge, up to a maximum of thirty per cent. or even more if desired, may be obtained.

The preferred form of the means by which I accomplish my object is shown in the accompanying drawings and hereinafter specifically described.

That which I believe to be new will be set forth in the claims.

Figure 1 is a diagrammatic view of my device shown in connection with a mercury motor meter, a battery, a generator, and circuits connecting them.

Referring to the drawing:—9 indicates the casing of an ordinary ampere-hour mercury motor meter, broken away at one side to show the mercury chamber 10, the spindle 11, and the armature 12 mounted thereon. The spindle 11 is journaled in any well known manner, being provided with a bearing 13 at its upper end.

14 indicates a damping disk secured on the upper portion of the spindle and adapted to be rotated within the field of permanent magnets 15—16.

17 indicates a permanent magnet which produces the field acting upon the armature, the pole pieces 18—19 of the magnet closely approaching the lower side of the armature.

20—21 indicate the contact points embedded in the casing of the meter with their inner ends in contact with the mercury contained in the chamber 10. Inasmuch as these parts are all of the ordinary construction and form no part of my present invention, it is believed that it is not necessary to further describe them here, as their operation is well understood by those skilled in the art.

Coming now to the shunting means by which a suitable definite part of the main current is directed through the armature for the purpose of measuring the same, 22 indicates a connecting block to which are connected two arms 23—24 of high resistance metal.

25—26 indicate connecting blocks at the ends of the arms 23—24, respectively.

27—28—29 indicate binding posts connected by means of arms of practically no resistance to the connecting blocks 25—22—26, respectively.

30—31 indicate short sections of high resistance wire connected with the connecting blocks 25—26 and connected together by means of a wire 32 of low resistance metal but of comparatively small cross section.

33 indicates a wire also of low resistance metal and of about the same cross section as the wire 32, in the construction shown, located alongside of the wire 32.

34 indicates a sliding clamp which serves to electrically connect the two wires 32 and 33 without appreciable resistance at any point along said wires.

35 indicates a connecting block of practically no resistance connected to one end of the wire 33, and 36—37 indicate lead wires from the connecting blocks 22—35 to the contacts 20—21, respectively.

The resistance of the parts 30—32—31 between the connecting-blocks 25 and 26 is preferably about two or three times that of either of the arms 23—24, although this is of course not essential.

38 indicates a two-way switch provided with contacts 39—40—41 and with a blade 42 which is adapted to connect either the contacts 39 and 40, as shown in the drawing, or the contacts 39 and 41, as will be readily understood.

43 indicates a storage battery, the positive pole of which is connected with the binding post 28, and the negative pole with the contact 39 of the switch.

44 indicates a generator, the positive pole of which is connected with the binding post 27, and the negative pole with the contact 40 of the switch.

45—46 indicate the mains, connected respectively to the contact 41 of the switch and with the binding post 29.

The operation of the device as shown and connected up is as follows:—With the blade 42 of the switch in the position shown so as to complete the circuit through the generator for charging the battery, the greater part of the current entering at 27 passes through the arm 23 to the connecting block 22 and thence to the binding post 28 and to the battery. A portion of the current, however, will be shunted away at the connecting block 25 through the section 30, the wire 32, the section 31, and the arm 24 to the connecting block 22, where it again joins the main current. The amount of current thus shunted around through the arm 24 will evidently depend upon the relative resistance of the arm 23 as compared with the resistance of the arm 24, plus that of the parts 31—32—30, and in the mechanism described this shunted current will be comparatively small. At the same time the current to operate the meter is also shunted off at the connecting block 25, through the section 30, sliding clamp 34 and wire 33, and through the meter circuit, joining the main current at the connecting block 22. The drop impressed on the meter circuit will evidently depend upon the drop between the connecting blocks 25 and 22 through the arm 23, and also upon the resistance of the section 30 plus the resistance of the wire 32 up to the place where the clamp 34 spans across to the wire 33, since this amount of resistance is in series with the circuit through the meter between the connecting blocks 25 and 22. If then the clamp 34 is at the left near the section 30, a maximum drop from the arm 23 will be impressed on the meter circuit, but at the same time the length of the portion of the wire 33 carrying the current will be a maximum, so that the resistance of the meter circuit is also a maximum. If the portion of the wire 33 to the right of the clamp 34 is so proportioned that its resistance decreases at the same rate that the drop impressed on the meter circuit decreases as the clamp 34 is moved to the right, the meter will run at constant speed for a given load, no matter where the clamp 34 is placed between the sections 30 and 31. If the conditions on discharge of the battery, however, be considered, they will be found different. With the blade 42 of the switch shifted to the left so as to connect contacts 39 and 41 to complete the circuit through the battery the shunt device and the mains for the purpose of utilizing the current from the battery, the greater part of the current entering at 28 will pass through the arm 24 to the connecting block 26, to the binding post 29, and thence to one of the mains. A portion of the current will be shunted off at the connecting block 22, through the arm 23, connecting block 25, section 30, wire 32, and section 31 to the connecting block 26, where it joins the main current. Another portion of the current will be shunted off at the connecting block 22, through the meter circuit, through the wire 33, clamp 34, wire 32 and section 31 to the connecting block 26, where it also joins the main current. Under these conditions, when the clamp 34 is at the right, there will be a maximum drop from the arm 24 to act upon the meter circuit, and at the same time there will be a minimum resistance in the meter circuit, since then the wires 32 and 33 will be entirely cut out of the meter circuit. This will cause the meter to run at greater speed for the same load than as described for charging the battery. If then the clamp 34 be moved toward the left, the drop through the meter circuit will be decreased and the resistance will be increased, so that the speed of the meter will be decreased on any given load passing from the binding post 28 to the binding post 29.

From the above description, it is evident that by adjusting the clamp 34 from right to left as desired, the meter can be changed over a considerable percentage of speed for current passing through it in one direction,— as just explained with the connections as shown and with the switch blade 42 shifted to the left,—whereas with the switch blade 42 shifted to the right as shown the same adjustment will give no appreciable change in the speed of the meter, with the current passing in the opposite direction, of course. It is thus evident that the clamp 34 may be set so that on the discharge of the battery the meter will be speeded up so that the indicator hand will traverse on discharge the same ground over which it passed in the other direction on charge, but for a smaller number of ampere hours on discharge, thereby giving automatically a desired percentage of overcharge when the indicator hand travels back to zero on charging. Since the meter records accurately the current used in charging the battery, when the percentage of overcharge required for any given battery is known, the true amount of current that the charged battery is capable of producing on discharge can of course be readily computed.

It will be understood, of course, that if desired the connections may be reversed so that the meter will record accurately on discharge the amount of current produced, in which case the clamp 34 may be set so as to slow down the speed of rotation on charging the battery so that the pointer will not indicate the amount of current used for charging the battery but will indicate rather the true amount of current that the battery will produce on discharge.

While I have shown my device in connection with a mercury motor ampere-hour meter, I do not wish to restrict myself to the use of my device in this way, as this is simply the preferred form.

While I have shown the connection between the connecting blocks 25 and 26 as composed of two high resistance sections 30 and 31 joined by a piece of low resistance wire 32, I do not restrict myself to that particular construction, as the principle of operation would be the same if it were constructed otherwise.

That which I claim as my invention, and desire to secure by Letters Patent, is,—

1. A current shunt, having end and intermediate terminals, a bridging connection between said end terminals, a variable resistance member adapted for connection to an instrument, and means adjustably connecting said variable resistance member to said bridging connection.

2. A current shunt, composed of two main members of predetermined resistance not adapted to be varied, connected at their inner ends to a common terminal, a third member of higher resistance connecting the outer ends of said main members, and means adjustably connected with said third member, and operating to vary the potential between said common terminal and said third member for a given flow of current through the shunt.

3. The combination of a current shunt having two main resistance members connected at their inner ends to a common terminal, and a bridging connection between the outer ends of said members, with a derived circuit connected at one end with said common terminal, and means adjustably connected with said derived circuit and said bridging connection, whereby the proportion of current flowing through said derived circuit may be varied when the main current flows through one of said main resistance members, but will remain constant when the main current flows through the other main resistance member.

4. The combination of a differential electric current shunt having two main current paths through one of which the current flows in one direction and through the other in an opposite direction, and a common connection connecting said main current paths at one end, with a derived circuit connected with said common connection, and means for causing the proportion of the current passing through said derived circuit to be less when the main current passes through one of said main current paths than when the main current passes through the other main current path.

5. The combination of an electric current shunt, having two main current paths, one adapted for use with a current passing in one direction and the other adapted for use with the current passing in an opposite direction, and a resistance connection between the outer ends of said main current paths, with a derived circuit, and means for varying the ratio of the derived current to the total current when said current is passing in one of said directions and for preserving a constant ratio of said derived current to said total current when said current is passing in the other direction.

6. The combination of a differential electric shunt provided with two main current paths having a common connection at one end, high resistance members on the other ends of each of said main current paths, a low resistance member connecting said high resistance members, and a movable connection on said low resistance member, with a derived circuit between the common connection of said main current paths and said movable connection, one portion of said derived circuit adjacent and connected to said movable connection being of relatively higher resistance than the remainder of said derived circuit.

7. The combination of a differential electric shunt, a terminal connected with said shunt and adapted to be connected with a storage battery, a second terminal connected with said shunt and adapted to be connected with a source of current, a third terminal connected with said shunt and adapted to be connected with a translating circuit, high resistance members connected respectively to said second and third terminals, a low resistance member connecting said high resistance members, and a movable connection on said low resistance member, with a derived circuit connected to said first terminal and said movable connection.

8. The combination of a differential electric shunt, a terminal connected with the shunt and adapted to be connected with a storage battery, a second terminal connected with the shunt and adapted to be connected with a source of current, a third terminal connected with the shunt and adapted to be connected with a translating circuit, high resistance members connected respectively to said second and third terminals, a low resistance member connecting said high resistance members, and a movable connection on said low resistance member, with a derived circuit connected to said first terminal and said movable connection, one portion of said derived circuit adjacent and connected to said movable connection being of relatively higher resistance than the remainder of said circuit.

ROBERT C. LANPHIER.

Witnesses:
CHARLES E. PICKARD,
W. H. DE BUSK.